United States Patent [19]

Lawrence

[11] Patent Number: 5,275,208
[45] Date of Patent: Jan. 4, 1994

[54] FLEXIBLE HOSE CONSTRUCTION AND METHOD OF MAKING THE SAME

[75] Inventor: James L. Lawrence, Ocala, Fla.

[73] Assignee: Dayco Products, Inc., Dayton, Ohio

[21] Appl. No.: 856,601

[22] Filed: Mar. 24, 1992

Related U.S. Application Data

[62] Division of Ser. No. 552,680, Jul. 12, 1990, abandoned.

[51] Int. Cl.$^5$ .................. F16L 11/04; B29C 47/06; B29C 47/20
[52] U.S. Cl. .................. 138/121; 138/109; 138/137; 156/244.13; 156/244.22; 156/292; 156/294
[58] Field of Search .......... 138/121, 122, 125, 124, 138/126, 173, 137, 132, 109; 156/143, 144, 149, 187, 188, 190, 195, 290, 292, 294, 244.13, 244.22

[56] References Cited

U.S. PATENT DOCUMENTS

| | | | |
|---|---|---|---|
| 2,449,369 | 9/1948 | Doane et al. | 138/121 |
| 2,757,690 | 8/1956 | Young | 138/121 |
| 2,785,382 | 3/1957 | Lamb | 138/121 |
| 3,580,289 | 5/1971 | James et al. | 138/121 |
| 3,944,453 | 3/1976 | Chudgar et al. | 138/132 |
| 4,102,724 | 7/1978 | Taylor | 138/125 |
| 4,261,390 | 4/1981 | Belafsky | 138/125 |
| 4,306,591 | 12/1981 | Arterburn | 138/125 |
| 4,415,389 | 11/1983 | Medford et al. | 138/121 |
| 4,417,603 | 11/1983 | Argy | 138/122 |
| 4,673,002 | 6/1987 | Scanlon | 138/121 |
| 5,089,074 | 2/1992 | Winter et al. | 138/121 |
| 5,148,836 | 9/1992 | Lawrence | 138/122 |

FOREIGN PATENT DOCUMENTS 1506776 4/1978 United Kingdom ............. 138/121

Primary Examiner—James E. Bryant, III
Attorney, Agent, or Firm—Joseph V. Tassone

[57] ABSTRACT

A flexible hose construction and method of making the same are provided, the flexible hose construction comprising an inner corrugated hose made of polymeric material and having a plurality of outwardly convex projections with recesses therebetween and extending from one end thereof to the other end thereof, an outer sleeve of reinforcing material disposed in telescoping relation on the inner hose, and a sleeve of porous and spongy polymeric material disposed between the sleeve of reinforcing material and the inner corrugated hose and having an outer peripheral surface that is substantially straight-line smooth and continuous and spaced outboard of the apexes of the projections and having an inner peripheral surface that substantially mates with and is disposed in engagement with the projections and the recesses from the one end to the other end of the inner corrugated hose.

10 Claims, 4 Drawing Sheets

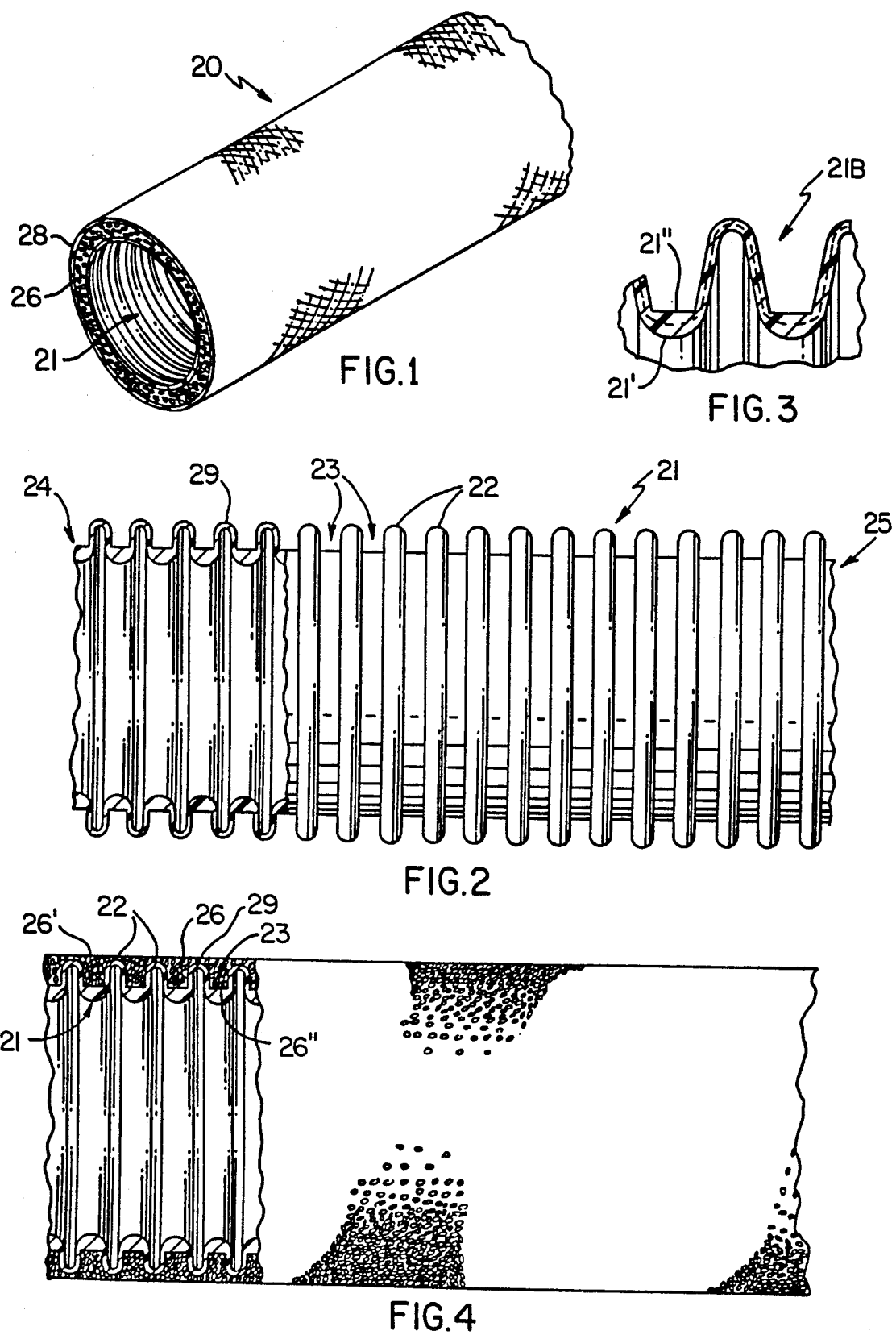

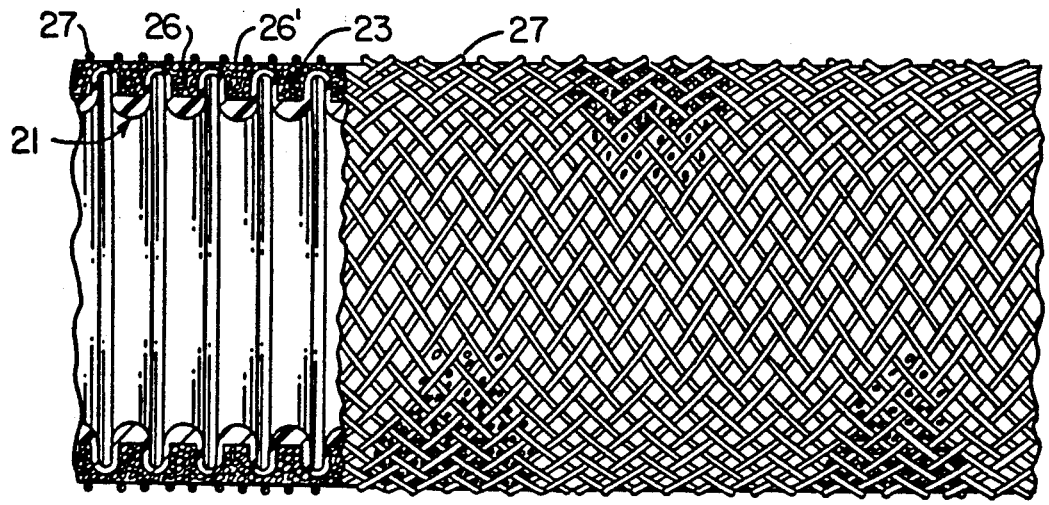
FIG. 5
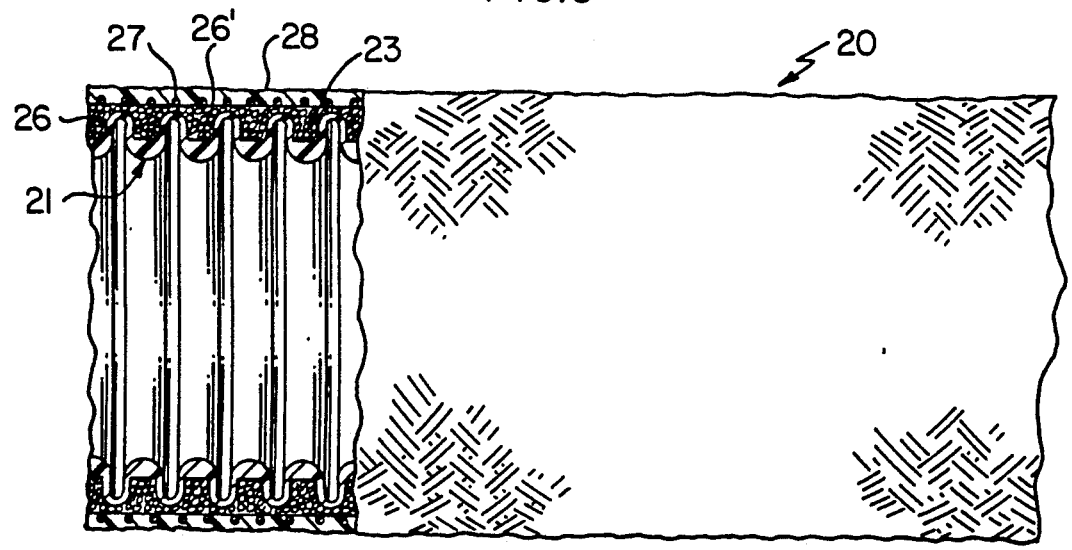
FIG. 6
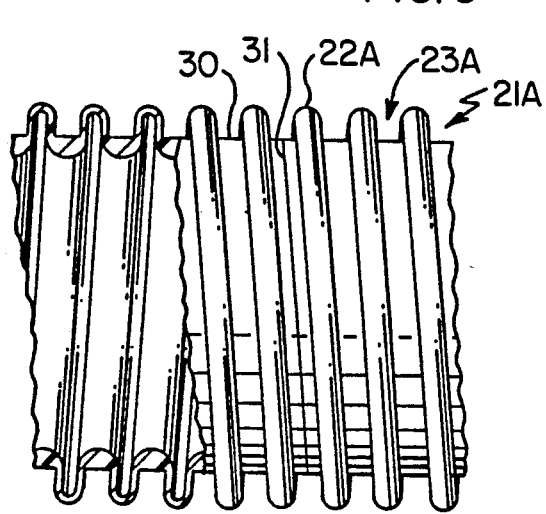
FIG. 7
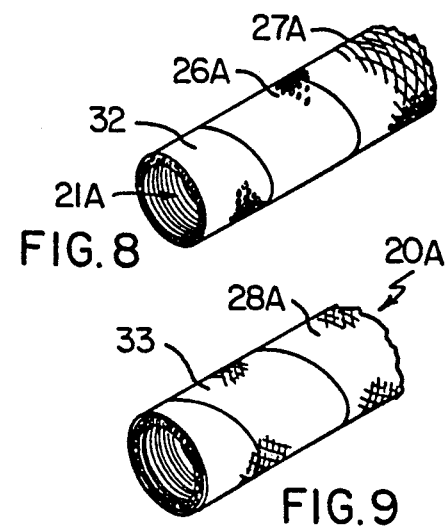
FIG. 8
FIG. 9

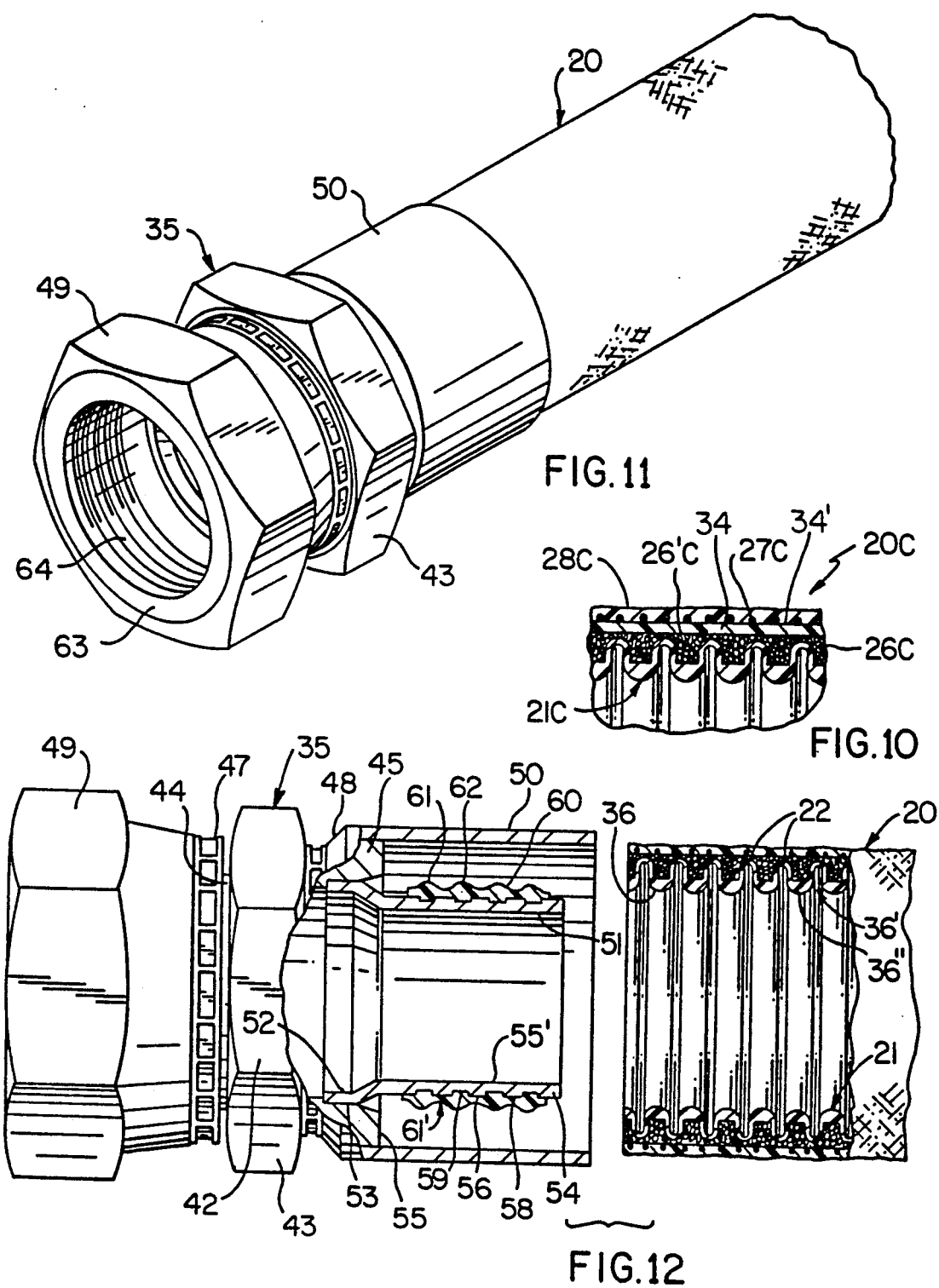

FLEXIBLE HOSE CONSTRUCTION AND METHOD OF MAKING THE SAME

CROSS REFERENCE TO RELATED APPLICATION

This application is a divisional patent application of its copending parent patent application, U.S. patent application Ser. No. 552,680, filed Jul. 12, 1990, now abandoned.

BACKGROUND OF THE INVENTION

1. Field of the Invention

This invention relates to a new flexible hose construction and to a new method of making such a flexible hose construction.

2. Prior Art Statement

It is known to provide a flexible hose construction comprising an inner corrugated hose made of polymeric material and having a plurality of outwardly convex projections with recesses therebetween and extending from one end thereof to the other end thereof, and an outer sleeve of reinforcing material disposed in telescoping relation on the inner hose. For example, see the U. S. patent to Medford et al, U.S. Pat. No. 4,415,389 and the copending U.S. patent application of Jeffrey J. Winter et al, U.S. patent application Ser. No. 405,487, filed Sep. 11, 1989.

SUMMARY OF THE INVENTION

It is one feature of this invention to provide a new flexible hose construction wherein the flexibility characteristics of an inner corrugated hose thereof are not substantially diminished by having an outer sleeve of reinforcing material extend into the recesses defined by the corrugations of the inner hose an amount that would diminish such flexibility characteristics.

In particular, it was found according to the teachings of this invention that a sleeve of porous and spongy polymeric material can be disposed between the sleeve of reinforcing material and the inner hose and have an outer peripheral surface that extends in a generally straight-line manner outboard of the projections of the inner hose so as to tend to prevent the sleeve of reinforcing material from entering into the recesses of the inner hose an amount that would tend to substantially reduce the flexibility characteristics of the corrugated inner hose.

In this manner, the inner corrugated hose can be formed of a thermoplastic material that readily permits the flexible hose construction to be utilized for conveying a volatile liquid therethrough, such as gasoline for transportation vehicles and the like, and still permit the hose construction to be sufficiently flexible and lightweight so that the same can be readily bent into the desired shape thereof for its intended conveying purpose.

For example, one embodiment of this invention provides a flexible hose construction comprising an inner corrugated hose made of polymeric material and having a plurality of outwardly convex projections with recesses therebetween and extending from one end thereof to the other end thereof, an outer sleeve of reinforcing material disposed in telescoping relation on the inner hose, and a sleeve of porous and spongy polymeric material disposed between the sleeve of reinforcing material and the inner corrugated hose and having an outer peripheral surface that is substantially straight-line smooth and continuous and spaced outboard of the apexes of the projections and having an inner peripheral surface that substantially mates with and is disposed in engagement with the projections and the recesses from the one end to the other end of the inner corrugated hose.

Accordingly, it is an object of this invention to provide a new flexible hose construction having one or more of the novel features of this invention as set forth above or hereinafter shown or described.

Another object of this invention is to provide a new method of making such a flexible hose construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a fragmentary perspective view, partially in cross section, and illustrating the new flexible hose construction of this invention.

FIG. 2 is an enlarged fragmentary side view, partially in cross section, and illustrating the inner corrugated hose of the hose construction of FIG. 1.

FIG. 3 is an enlarged fragmentary cross-sectional view of another inner hose of this invention for the hose constructions of this invention.

FIG. 4 is a view similar to FIG. 2 and illustrates the inner corrugated hose of FIG. 2 having a unique sleeve of porous and spongy polymeric material disposed thereon according to the method of this invention.

FIG. 5 is a view similar to FIG. 4 and illustrates how a sleeve of reinforcing material is disposed on top of the sleeve of porous and spongy polymeric material that has been placed on the inner corrugated hose as illustrated in FIG. 4.

FIG. 6 is a view similar to FIG. 5 and illustrates how an outer polymeric layer is disposed over the reinforcing sleeve of FIG. 5 to complete the hose construction of this invention that is illustrated in FIG. 1.

FIG. 7 is a fragmentary view similar to FIG. 2 and illustrates another embodiment of the inner corrugated hose.

FIG. 8 is a fragmentary perspective view similar to FIG. 1 and illustrates how a sleeve of porous and spongy polymeric material and a reinforcing sleeve can be disposed in series on the corrugated hose of FIG. 7.

FIG. 9 is a view similar to FIG. 8 and illustrates a complete hose construction of this invention made from the structure of FIG. 8 by having an outer polymeric layer disposed over the reinforcing layer of the structure of FIG. 8.

FIG. 10 is a fragmentary cross-sectional view illustrating another new hose construction of this invention.

FIG. 11 is a fragmentary perspective view of the new hose construction of this invention having a coupling secured to one end thereof.

FIG. 12 is a fragmentary view, partially in cross section, and illustrates how the coupling member of FIG. 11 is to be assembled to the hose construction of FIG. 1.

DESCRIPTION OF THE PREFERRED EMBODIMENTS

Figure 13:
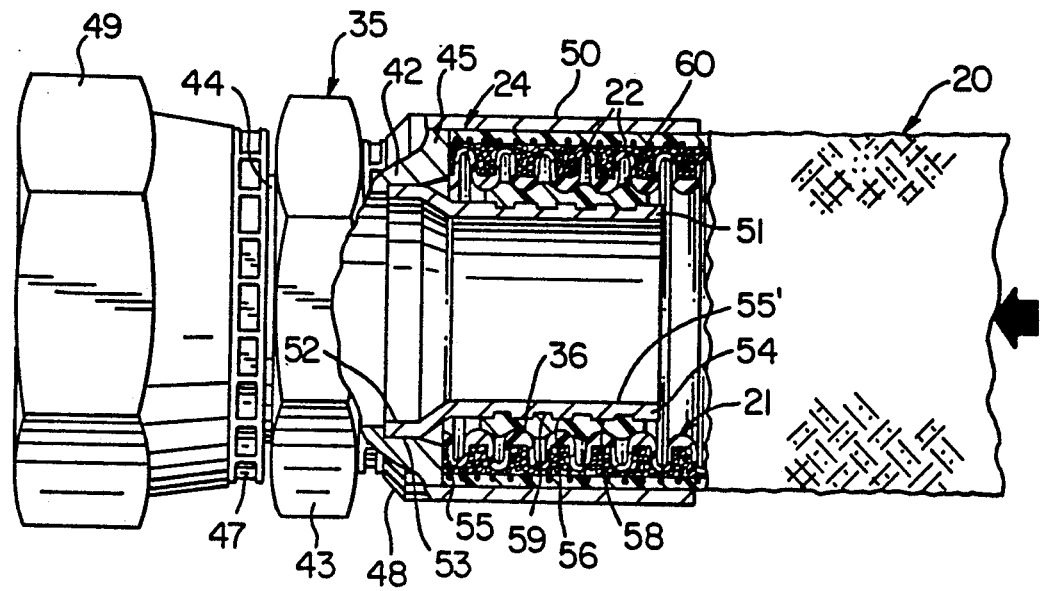
FIG. 13 is a view similar to FIG. 12 and illustrates the coupling of FIG. 12 having been telescoped with the end of the hose construction of FIG. 12.

While the various features of this invention are hereinafter illustrated and described as being particularly adapted to provide a flexible hose construction for conveying gasoline and like volatile liquids therethrough, it is to be understood that the various features of this invention can be utilized singly or in various combinations thereof to provide a flexible hose construction for conveying any other fluid therethrough for other types of apparatus as desired.

Therefore this invention is not to be limited to only the embodiments illustrated in the drawings, because the drawings are merely utilized to illustrate one of the wide variety of uses of this invention.

Referring now to FIG. 1, the new flexible hose construction of this invention is generally indicated by the reference numeral 20 and comprises an inner corrugated hose 21, FIG. 2, formed of any suitable polymeric material and having a plurality of outwardly convex projections 22 with recesses 23 therebetween and extending from one end 24 to the other end 25 thereof, a sleeve 26 of any suitable porous and spongy polymeric material extending in a generally continuous straight-line manner outboard of the projections 22 as illustrated in FIG. 4, an outer sleeve 27 of any suitable reinforcing material disposed in telescopic relation on the tube 26, and an outer layer 28 of any suitable polymeric material that will provide a protection for the sleeve 27 of reinforcing material and also to tend to prevent any liquid that is conveyed through the flexible hose construction 20 from permeating to the exterior thereof, such as gasoline and the like.

As previously stated, it was found that the hose construction 20 can be relatively flexible because of the corrugated inner hose 21 thereof.

However, it was further found that the flexibility characteristics of such a hose construction 20 is diminished if a sufficient amount of the reinforcing means 27 is received in the recesses 23 of the inner hose 21 to resist the bending thereof.

Therefore, it was found according to the teachings of this invention that by providing the sleeve 26 of porous and spongy polymeric material on the inner hose 21 before disposing the reinforcing sleeve 27 thereon with the sleeve 26 being so constructed and arranged that the same has an outer peripheral surface 26' that is substantially straight-line smooth and continuous and spaced outboard of the apexes 29 of the projections 22 and has an inner peripheral surface 26" that substantially mates with and is disposed in engagement with the projections 22 and the recesses 23 from one end 24 to the other end 25 of the inner corrugated hose 21 in the manner illustrated in FIG. 4, the sleeve 26 will substantially resist the penetration of the reinforcing layer 27 into the recesses 23 of the inner hose 21 to any great degree even though the reinforcing layer 27 is being forced radially inwardly either through the normal effect of applying the same onto the inner hose 21 and/or by the force of the outer cover 28 being applied over the reinforcing means 27 in a conventional hose forming manner whereby it can be seen that the recesses 23 remain substantially void of the reinforcing means 27 so as to retain the desired flexibility characteristics of the inner hose 21. And because of the porous and spongy nature of the sleeve 26, the sleeve 26 itself does not significantly affect the flexibility of the inner corrugated hose 21.

While the inner hose 21 of the hose construction 20 of this invention can be formed of any suitable material and in any suitable manner, the inner hose 21 can comprise thermoplastic material that is blow molded in a conventional manner into the configuration illustrated in FIG. 2 wherein the convolutions or projections 22 thereof are annular and are uniformly spaced from each other throughout the length of the hose 21 or can be disposed in a helical manner throughout the length of the hose as represented by the projections 22A illustrated in FIG. 7 wherein another inner hose of this invention is indicated by the reference numeral 21A and parts thereof similar to the inner hose 21 previously described are indicated by like reference numerals followed by the reference letter "A". The inner hose 21A is made in a conventional manner by spirally wrapping a strip 30 that has the projections 22A and recesses 23A formed therein in any suitable manner and forming a helically disposed seam 31 throughout the length of the inner hose 21A.

One problem with thermoplastic hoses currently being made is the stiffness thereof when compared to elastomeric rubber hoses of the same inner and outer dimensions. The stiffness of the prior known thermoplastic hoses is due to the rigidity of the plastic material. However, by using a convoluted or corrugated inner tube, the flexibility of the thermoplastic hose can be made greater than a rubber hose of the same size. The convolutions can be annular in nature and their geometry can be dependent upon the size of the hose to be produced.

A thermoplastic hose with a corrugated inner tube also has other advantages over conventional rubber hoses.

In particular, a plastic hose construction built with a convoluted inner corrugated hose has better kink resistance and a smaller bend radius than a rubber hose of the same size.

These properties are a result of the annular rings that form the convoluted tube. These annular rings provide hoop strength that results in superior kink resistance and smaller bend radius compared to smooth inner tube hoses.

Also, a corrugated inner hose of plastic material is lighter in weight per foot than a rubber hose. To reduce kinking and bend radius, conventional rubber hoses rely on thick hose walls and/or a helix wire. In contrast, the corrugated plastic hose 21 of this invention provides an excellent kink resistance so that a lightweight, thin wall hose construction 20 can be built without compromising kink resistance or bend radius.

The long-term resistance of plastic materials to degradation and wear is greater than that of rubber materials. For example, a large number of plastic materials are available with much better resistance to hydrocarbon-based liquids, such as gasoline, than standard rubber compounds. Certain thermoplastics offer greater ozone, abrasion and UV resistance than rubber compounds. Thermoplastics are also more easily colored and are more colorfast.

Therefore, the thermoplastic material of the inner hose 21 of this invention is chosen based on the chemical and thermal resistance requirements of the application of the hose construction 20 and based on a means to bond the corrugated inner hose 21 to the subsequently disposed layers thereon.

Thus, the inner hose 21 can comprise a single layer of a homogeneous thermoplastic material as illustrated in FIGS. 2 and 4-7 or the same can comprise an inner layer 21' of one type of thermoplastic material and an outer layer 21'' of another type of thermoplastic material as provided for the inner hose 21B illustrated in FIG. 3 as it is well known that two plastic materials can be extruded together to form a tubular member having one material forming the outer surface thereof and the other material forming the inner surface thereof and thereafter such tubular member can be blow molded to form the same into a corrugated tubular member.

In any event, the sleeve 26 of porous and spongy polymeric material can be applied over the inner hose 21 either as a continuous sleeve by conventional extruding apparatus whereby the exuding sleeve 26 conforms to and bonds by the nature thereof to the projections 22 and recesses 23 in the substantially straight-line manner illustrated in FIG. 4 or the sleeve 26 could be disposed in a spiral manner as illustrated in FIG. 8 and comprise a strip 32 of polymeric material that is helically wound onto the inner tube 21A as illustrated in FIG. 8. However, it is to be understood that the inner tube 21A illustrated in FIG. 8 could be the inner tube 21 of FIG. 2 or the inner tube 21B of FIG. 3 rather than a tube wherein the projections are disposed in a helical manner, as desired.

In any event, it can be seen that the sleeve 26 provides a smooth continuous surface 26' over the projections 22 and provides a consistent base for receiving the reinforcement 27 thereon. The material of the sleeve 26 can be chosen so that it will provide continuous contact or engagement as well as adhere to the outer surface of the inner hose 21 so that the sleeve 26 tends to prevent any separation and slippage of the plies of the hose construction 20 even under severe flexing conditions.

After the outer sleeve 26 has been applied in place in the manner previously set forth, the reinforcement sleeve 27 of either a braided textile material or a metal wire material that is wound in alternating directions is disposed over the sleeve 26 and the amount of reinforcement provided is dependent upon the working pressure requirements of the hose construction 20.

For example, the reinforcement sleeve 27 is illustrated as a braided material in FIG. 5 and thereby comprising a seamless sleeve of such material whereas the reinforcement 27A of FIG. 8 is illustrated as two layers of helically wound wire material disposed in opposite directions on the sleeve 26A.

In any event, it can readily be seen in FIG. 5 that the reinforcment sleeve 27 cannot enter the recesses 23 of the inner hose 21 because the sleeve 26 prevents the same from being forced into the recesses 23 as the reinforcement sleeve 27 is being applied to the desired thickness on the inner tube 21.

Thereafter, the outer layer 28 of any suitable polymeric material is applied over the reinforcement 27 such as by being extruded as a continuous tube thereof by conventional extruding apparatus to complete the hose construction 20 or by being applied in a helically wound form thereof from a strip 33 of such outer material in the manner illustrated in FIG. 9 to complete the hose construction 20A.

In any event, the outer layer 28 provides protection for the reinforcement 27 and can readily bond to the inner sleeve 26 by exuding through the reinforcement 27 in a manner well known in the art and as illustrated in FIG. 6 so as to hold all of the layers of the hose construction 20 in a bonded condition thereof, if desired.

The material of the outer layer 28 not only protects the reinforcement 27 from physical or chemical damage, but also the cover layer 28 is chosen with consideration to the environment and bondability to the other layers of the hose construction 20. In addition, the material 28 can be chosen so as to tend to prevent the liquid flowing through the hose construction 20 from permeating through the hose construction 20 to the exterior thereof.

While the hose construction 20 has been described as having a smooth continuous surface 26' to which the reinforcement layer 27 is applied, it is to be understood that additional extruded layers, such as the polymeric layer or sleeve 34 of FIG. 10, could be disposed on the porous and spongy sleeve 26 before the reinforcement layer 27 to provide an even smoother and more uniform surface 34' to apply the reinforcement layer 27 and provide additional contact area for the cover 28 to adhere.

Thus, it can be seen that the hose construction 20C of this invention that is illustrated in FIG. 10 comprises the inner corrugated hose 21C, the porous and spongy sleeve 26C, the intermediate layer or sleeve 34, the reinforcement 27C and the cover 28C.

As previously stated, the materials of the hose construction 20 of this invention can be any suitable materials that function in the manner previously set forth.

As previously set forth, similar hose constructions to the hose constructions of this invention are set forth in the copending patent application to Jeffrey J. Winters et al, U.S. patent application Ser. No. 405,487, filed Sep. 11, 1989 and such similar hose constructions have been provided with unique couplings in a manner fully illustrated and described in another copending U.S. patent application to John D. Sanders et al, U.S. patent application Ser. No. 408,161, filed Sep. 15, 1989.

Therefore, while such unique coupling structure and method do not form a part of this invention, such structure and method will now be described in order to illustrate how the hose constructions of this invention can be effectively coupled into a system for conveying any desired fluids, such as the aforementioned gasoline, etc.

Thus, reference is now made to FIGS. 11-14 wherein it can be seen that a unique coupling 35 is secured to the end 24 of the hose construction 20.

The coupling 35 seals to the inner peripheral surface means 36 of the hose 21, is formed of any suitable metallic material and comprises a tubular body member 42 having a hexagonal nut-like portion 43 disposed intermediate two parts 44 and 45 thereof and onto which ends 47 and 48 of a rotatable nut 49 and outer sleeve 50 are secured in the manner illustrated in FIG. 12, the nut 49 being rotatable relative to the body member 42 while the outer sleeve 50 is interconnected to the body member 42 in substantially a nonrotatable manner therewith.

An inner sleeve 51 of the coupling 35 has one end 52 thereof secured in an internal annular recess 53 of the body member 42, such as by brazing or the like, so that the other end 54 of the sleeve 51 projects out of an end 55 of the body member 42, the sleeve 51 having a substantially smooth internal peripheral surface means 55' and a corrugated external peripheral surface means 56 defined by a plurality of outwardly blunt projections 58 with recesses 59 therebetween. The projections 58 and recesses 59 are annular but could be helically formed, if desired. A sleeve 60 of polymeric material is carried on the sleeve 51 and has annular projections 61 on the outer peripheral surface 62 thereof.

The sleeve 51 is formed of a metallic material that readily permits the same to be radially outwardly expanded from the condition illustrated in FIG. 13 to the condition illustrated in FIG. 14 whereby the sleeve 60 cooperates with the inner corrugated hose 21 of the hose construction 20 to seal therewith as will be apparent hereinafter.

While the coupling 35 can be formed of any suitable material, the body member 42 and nut 49 can be formed of brass while the sleeves 50 and 51 are formed of copper.

The nut 49 has its end 63 internally threaded at 64 so as to couple the coupling 35 to any desired structure.

Thereafter, the coupling 35 as illustrated in FIG. 12 is telescoped with the end 24 of the hose construction 20 so that the member 60 and the outer sleeve 50 are disposed over the end 24 of the hose construction 20 in the manner illustrated in FIG. 13.

Figure 14:
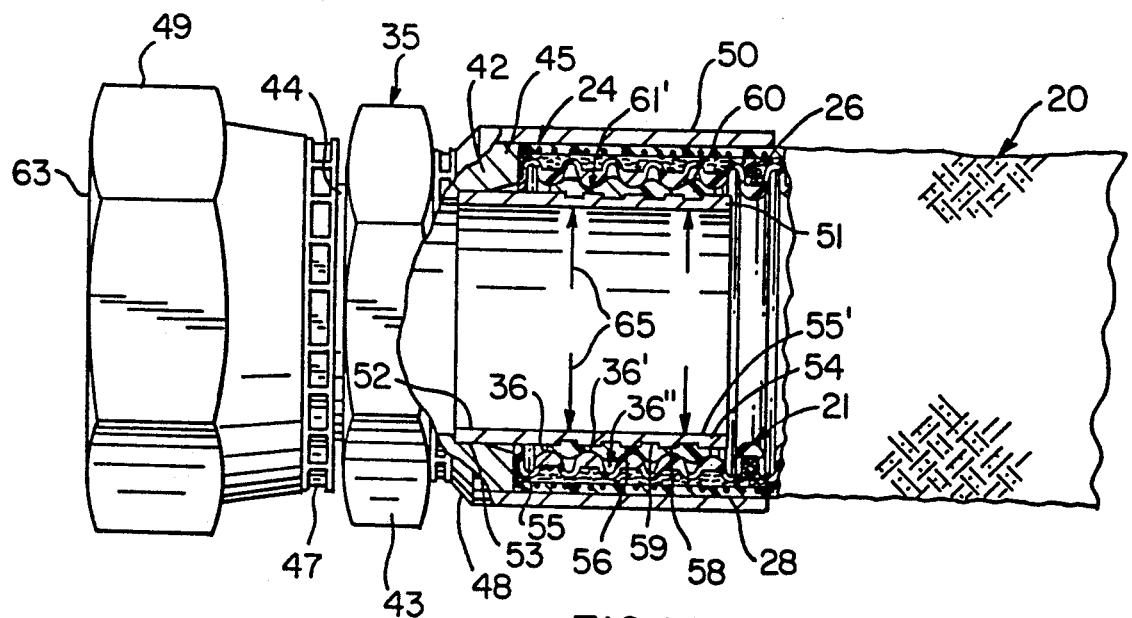
FIG. 14 is a view similar to FIG. 13 and illustrates how the insert means of the coupling is radially outwardly expanded into its sealing relation with the hose construction of FIG. 13 to complete the hose construction of FIG. 11.

Thereafter, the inner sleeve 51 is outwardly radially expanded as provided by the arrows 65 in FIG. 14 and in a manner well known in the art, such as set forth in the U.S. Pat. No. 3,072,174 to Vanderhoof, and the U.S. Pat. No. 3,557,434 to Delahunty, which are being incorporated into this disclosure by this reference thereto to radially outwardly expand the member 60 and cause the hose end 24 to compact against the outer sleeve 50 so that the projections 61 of the member 60 firmly move into the recesses 36' of the inner hose 21 of the hose construction 20 to cause the inward projections 36" of the inner hose 21 of the hose construction 20 to more firmly move into the recesses 61' of the member 60 to fluidly seal the interior or internal surface means 66 of the coupling 32 to the interior or internal surface means 36 of the hose construction 20 in the manner illustrated in FIG. 14 so as to prevent any fluid leakage therebetween even though a volatile liquid, such as gasoline or the like, is being conveyed through the interior of the hose construction 20.

It is believed that this unique sealing effect is caused by the fact that the projections 36" of the inner hose 21 can readily be shaped into sealing relation with the recesses 61' of the member 60 because of the porous and spongy sleeve 26 in the inner hose 21 between the projections 36" thereof.

Thus, the radially outwardly expanded sleeve 51 causes the external peripheral surface means 62 of the member 60 to form into the inner hose 21 of the hose construction 20 as well as to fasten the end 24 of the hose construction 20 in compressed relation between the sleeves 51 and 50 as illustrated in FIG. 14 to securely fasten the hose construction 20 to the coupling 35.

Therefore, it can be seen that the coupling 35 is readily fastened to the hose construction 20 through the means 60 of the coupling 35 which also fluidly seals the coupling 35 to the hose construction 20 as previously set forth.

As previously stated, any suitable sizes and materials can be utilized when forming a hose construction of this invention.

Therefore, it is believed that the following example of one embodiment of the hose construction 20 of this invention will function in the manner previously set forth whereby such contemplated example is not to be a limitation on this invention and is merely being given as one contemplated example thereof.

For example, the inner hose can be formed in the manner of FIG. 3 with the inner layer 21' comprising a thermoplastic material sold by DuPont as Zytel ST811HS and with the outer layer 21" thereof comprising a thermoplastic material sold by the B.F. Goodrich Company as ESTANE 5710F1. Such material can be blow molded to form the hose 21B with an inside diameter of approximately 1.500 of an inch and with the distance between the apexes 29B of the projections 22B being approximately 0.246 of an inch. The thickness of the inner portions of the hose 21B can be approximately 0.045 of an inch while the sidewalls between the inner portion and the apexes are actually disposed at an angle relative to each other rather than being parallel to each other as illustrated in FIGS. 2 and 4, such angle of each sidewall being approximately 10° to a true transverse line passing through the inner hose 21B.

The porous and spongy sleeve 26 can be a foamed or foamable polyethelene that is extruded over the inner hose 21 to bond thereto as previously set forth.

The tube 34 of FIG. 10 is being utilized in such example of the hose construction of this invention. The tube 34 can also comprise the thermoplastic material ESTANE 5710F1 and be approximately 0.040 of an inch thick while the reinforcement 27 can comprise a polyester yarn formed on a thirty-six carrier braiding machine with two ends per carrier and the outer layer 28 can comprise the thermoplastic material ESTANE 5710F1 and be approximately 0.060 of an inch thick.

In this manner, the thermoplastic material of the cover 28 will readily bond to the tube 34 and the thermoplastic material of the tube 34 will readily bond to the outer surface 26' of the porous and spongy sleeve 26.

Therefore, it can be seen that the resulting hose construction 20, 20A, 20B or 20C of this invention is readily adapted to be utilized for conveying any desired fluid therethrough, such as a volatile liquid, and will permit the hose construction 20, 20A, 20B or 20C to be disposed in a bent configuration for such purpose as desired.

Thus, this invention provides a new flexible hose construction and a new method of making such a flexible hose construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim according to this invention in the portion of each claim that is disposed after the terms "the improvement" whereby it is believed that each claim sets forth a novel, useful and unobvious invention within the purview of the Patent Statute.

What is claimed is:

1. In a flexible hose construction comprising an inner corrugated hose made of polymeric material and having a plurality of outwardly convex projections with recesses therebetween and extending from one end thereof to the other end thereof, an outer sleeve of reinforcing material disposed in telescoping relation on said inner corrugated hose, and a sleeve of porous and spongy polymeric material disposed between said sleeve of reinforcing material and said inner corrugated hose and having an outer peripheral surface that is substantially straight-line smooth and continuous and spaced outboard of the apexes of said projections and having an inner peripheral surface that substantially mates with and is disposed in engagement with said projections and said recesses from said one end to said other end of said inner corrugated hose, the improvement comprising a tube of polymeric material disposed between said outer peripheral surface of said sleeve of porous and spongy polymeric material and said sleeve of reinforcing material, said tube of polymeric material having an outer peripheral surface that is engaged by said sleeve of reinforcing material, and an outer sleeve of polymeric material telescopically disposed on said sleeve of reinforcing material, said outer sleeve of polymeric material being bonded to said outer peripheral surface of said tube of polymeric material through said sleeve of reinforcing material.

2. A flexible hose construction as set forth in claim 1 wherein said sleeve of porous and spongy polymeric material is extruded onto said inner corrugated hose before said outer sleeve of reinforcing material is disposed in said telescoping relation on said inner corrugated hose.

3. A flexible hose construction as set forth in claim 1 wherein said projections are annular and disposed substantially transverse to the longitudinal axis of said hose construction.

4. A flexible hose construction as set forth in claim 1 wherein said projections of said inner hose extend in a helical path about the longitudinal axis of said hose construction.

5. A flexible hose construction as set forth in claim 1 wherein said inner hose is formed of thermoplastic material.

6. In a method of making a flexible hose construction comprising an inner corrugated hose made of polymeric material and having a plurality of outwardly convex projections with recesses therebetween and extending from one end thereof to the other end thereof, an outer sleeve of reinforcing material disposed in telescoping relation on said inner corrugated hose, and a sleeve of porous and spongy polymeric material disposed between said sleeve of reinforcing material and said inner corrugated hose and having an outer peripheral surface that is substantially straight-line smooth and continuous and spaced outboard of the apexes of said projections and having an inner peripheral surface that substantially mates with and is disposed in engagement with said projections and said recesses from said one end to said other end of said inner corrugated hose, the improvement comprising the steps of disposing a tube of polymeric material between said outer peripheral surface of said sleeve of porous and spongy polymeric material and said sleeve of reinforcing material so that an outer peripheral surface of said tube of polymeric material is engaged by said sleeve of reinforcing material, telescopically disposing an outer sleeve of polymeric material on said sleeve of reinforcing material, and bonding said outer sleeve of polymeric material to said outer peripheral surface of said tube of polymeric material through said sleeve of reinforcing material.

7. A method of making a flexible hose construction as set forth in claim 6 and comprising the step of extruding said sleeve of porous and spongy polymeric material onto said inner corrugated hose before said outer sleeve of reinforcing material is disposed in said telescoping relation on said inner corrugated hose.

8. A method of making a flexible hose construction as set forth in claim 6 and comprising the step of forming said projections to be annular and to be disposed substantially transverse to the longitudinal axis of said hose construction.

9. A method of making a flexible hose construction as set forth in claim 6 and comprising the step of forming said projections of said inner hose to extend in a helical path about the longitudinal axis of said hose construction.

10. A method of making a flexible hose construction as set forth in claim 6 and comprising the step of forming said inner hose to be formed of thermoplastic material.

* * * * *